B. E. J. EILS.
Mercurial Proof and Test Gages.
No. 151,367. Patented May 26, 1874.
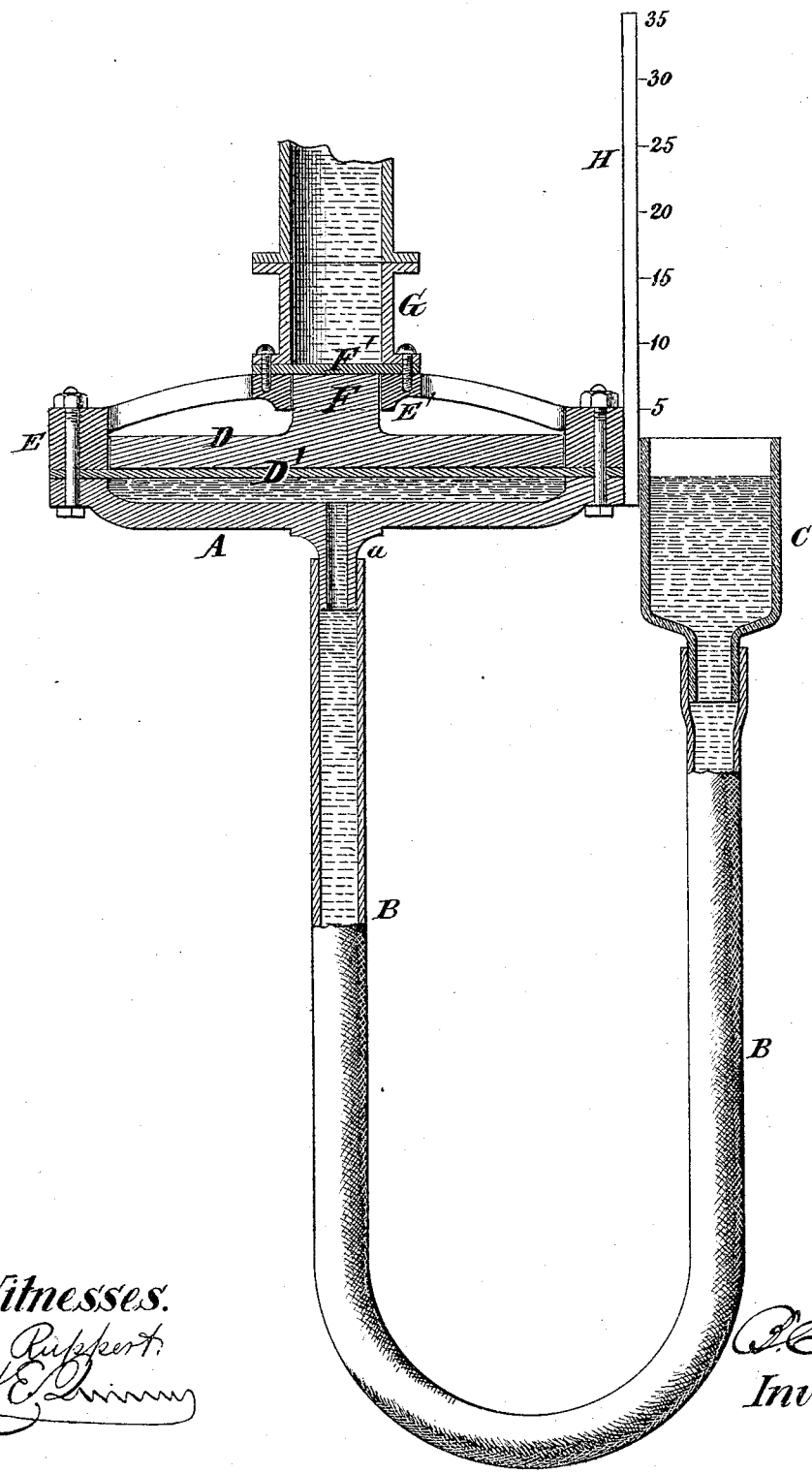
Witnesses.
Inventor.

UNITED STATES PATENT OFFICE.

B. EDWARD J. EILS, OF WASHINGTON, DISTRICT OF COLUMBIA, ASSIGNOR TO MARY E. QUINN, OF SAME PLACE.

IMPROVEMENT IN MERCURIAL PROOF AND TEST GAGES.

Specification forming part of Letters Patent No. 151,367, dated May 26, 1874; application filed April 29, 1874.

*To all whom it may concern:*

Be it known that I, B. EDWARD J. EILS, of Washington, in the District of Columbia, have invented a certain Improved Mercurial Proof and Test Gage, of which the following is a specification:

The object of my invention is to provide an accurately-effective, but nevertheless exceedingly simple and easily-applied, apparatus for graduating and proving pressure-gages and testing boilers up to any desired pressure.

My invention consists in the employment of a column of mercury, carried in a flexible tube, to permit a ready change of elevation of its free end on a graduated scale, in combination with a reservoir, also filled with mercury, and a differential piston, the larger head of which, covering the reservoir, receives the pressure due to the measured height of the column of mercury above it, to transmit the same by its smaller head to the gage or boiler, through the medium of an incompressible fluid, such as water.

The annexed drawing represents a sectional elevation of the apparatus.

The reservoir A consists of a shallow dish, provided with a perforated nipple, a, to which one end of the flexible tube B is connected. The top of the reservoir is covered by the larger head D of a differential piston, a flexible diaphragm, D', being interposed to make a tight joint and relieve this head of the piston of all friction. The ring E, which clamps the diaphragm D' to the flange of the reservoir and encircles the head D, has a central hub, E', bored to receive the smaller head F of the piston, which is connected thereto by the flexible diaphragm F', clamped between the hub and the lower flange of a pipe or coupling, G. The head F fits loosely in the hub E'. The diaphragms should be firmly secured to the respective heads of the piston. The flexible tube B carries at its free end an open glass cup, C, serving the twofold purpose of a fountain from which to supply mercury to the tube as it expands on lifting the cup, and of an indicator, showing the level of the mercury at this end of the tube. The aggregate pressure against the head D of the piston, due to any elevation of the column above the surface of the mercury in the reservoir, is indicated by figures upon an accurately-graduated vertical scale, H, on which the glass cup of the flexible tube is moved up and down, and in practice the area of the head F is, preferably, exactly one square inch, so that the figures on the scale will give the pressure per square inch on the gage or boiler.

The operation of the apparatus is as follows: The reservoir is placed, with the piston, in a vertical position, as shown, and the glass cup on the free end of the flexible tube held so that the level of the mercury therein will be level with the surface of the mercury in the reservoir, so that no pressure is exerted upon the piston. The gage or boiler to be tested, having been filled with water, is then connected to the coupling G of the apparatus by a suitable pipe, and all the connections are filled with water down to the diaphragm F'. The liquids having found their equilibrium, the scale H is adjusted so that its zero-line will be on line with the surface of the mercury in the glass cup.

In graduating a gage, the cup is successively raised to bring the surface of the mercury successively in line with the gradations of the scale, marks and figures corresponding to those on the scale being made on the index of the gage, until the highest pressure to be indicated is reached. The movement of the cup is then reversed, and each mark made on the gage during the ascent is verified in the descent of the cup, until zero is reached.

In testing a boiler, it is only necessary to carry the mercury surface in the cup up to the number on the scale indicating the pressure desired.

The use of the differential piston enables me to transmit high pressures, while the vertical movement of the cup can be kept within convenient limits. Thus, let the proportion of the two heads of the piston be as twenty-five to one; then, by lifting the mercury surface in the cup, say, five feet above that in the reservoir, the pressure transmitted through the small head will approximate seven hundred and fifty pounds.

By properly proportioning the heads of the piston, or by using a plurality of them, very high pressures may be easily and conveniently transmitted.

Of course I do not hereby limit myself to the particular construction shown, as that is capable of many modifications. The graduated scale may be entirely separate from the other parts of the apparatus; so may the mercury surface in the free end of the tube be indicated through other means than those shown.

What I claim as my invention, and desire to secure by Letters Patent, is—

The combination of the reservoir and flexible tube, filled with mercury, with the differential piston and graduated vertical scale, substantially as set forth.

In testimony whereof I have signed my name to the foregoing specification in the presence of two subscribing witnesses.

B. EDW. J. EILS.

Witnesses:
 H. E. QUINN,
 ALONZO HUGHES.